United States Patent
Priepke

(10) Patent No.: US 7,252,190 B2
(45) Date of Patent: Aug. 7, 2007

(54) BALE WAGON LOAD RACK AND ROUND BALE UNLOADING ATTACHMENT

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 258 days.

(21) Appl. No.: 11/196,714

(22) Filed: Aug. 3, 2005

(65) Prior Publication Data

US 2007/0041811 A1 Feb. 22, 2007

(51) Int. Cl.
*B65G 25/04* (2006.01)

(52) U.S. Cl. .............. 198/750.2; 198/750.5; 414/24.5; 414/525.9

(58) Field of Classification Search .. 198/750.2–750.6; 414/24.5, 525.1, 525.9
See application file for complete search history.

(56) References Cited

U.S. PATENT DOCUMENTS

| | | | |
|---|---|---|---|
| 4,611,708 A * | 9/1986 | Foster | 414/525.1 |
| 4,856,645 A | 8/1989 | Hallstrom, Jr. | |
| 5,222,593 A | 6/1993 | Quaeck | |
| 5,405,229 A * | 4/1995 | Tilley et al. | 414/111 |
| 5,431,523 A * | 7/1995 | Ferguson | 414/525.9 |
| 5,531,555 A * | 7/1996 | Meijer | 414/24.5 |
| 5,542,803 A * | 8/1996 | Driggs | 414/111 |
| 5,560,472 A | 10/1996 | Gist | |
| 5,697,758 A * | 12/1997 | Tilley | 414/802 |
| 5,758,481 A * | 6/1998 | Fry | 56/474 |
| 5,813,814 A * | 9/1998 | Smart | 414/111 |
| 5,839,568 A * | 11/1998 | Clark | 198/750.5 |
| 5,882,163 A * | 3/1999 | Tilley | 414/111 |
| 6,935,827 B2 * | 8/2005 | Delaurier | 414/24.5 |
| 2006/0188363 A1* | 8/2006 | Priepke | 414/501 |

\* cited by examiner

*Primary Examiner*—Mark A Deuble
(74) *Attorney, Agent, or Firm*—John William Stader; Michael G. Harms

(57) ABSTRACT

A bale wagon for large bales that uses a load rack made of a plurality of longitudinal spaced-apart channel members that move in segments to transfer the load rearwardly for unloading. A tilting bed round bale unloader deposits bales one tier at a time onto their cylindrical surfaces on the ground.

15 Claims, 8 Drawing Sheets

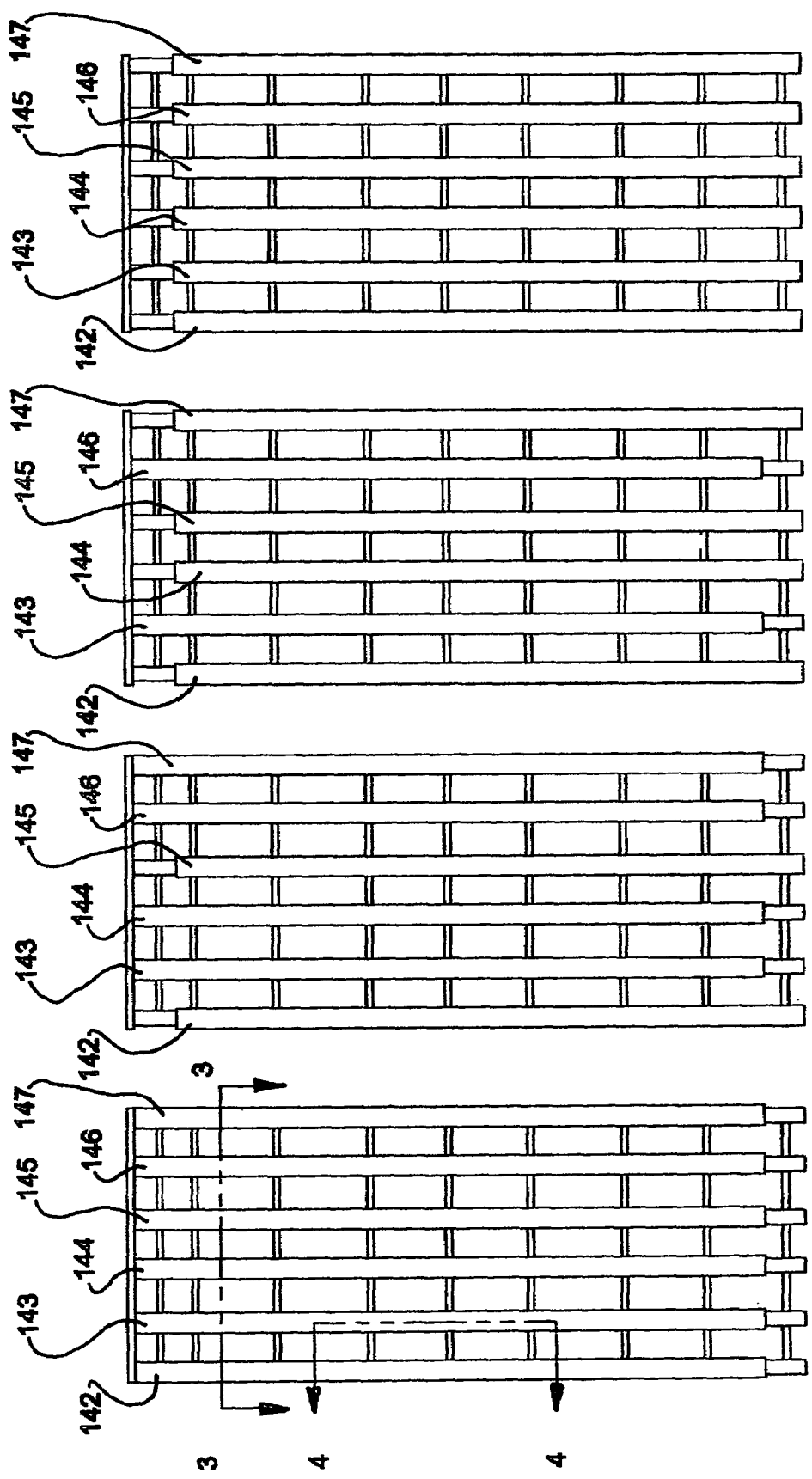

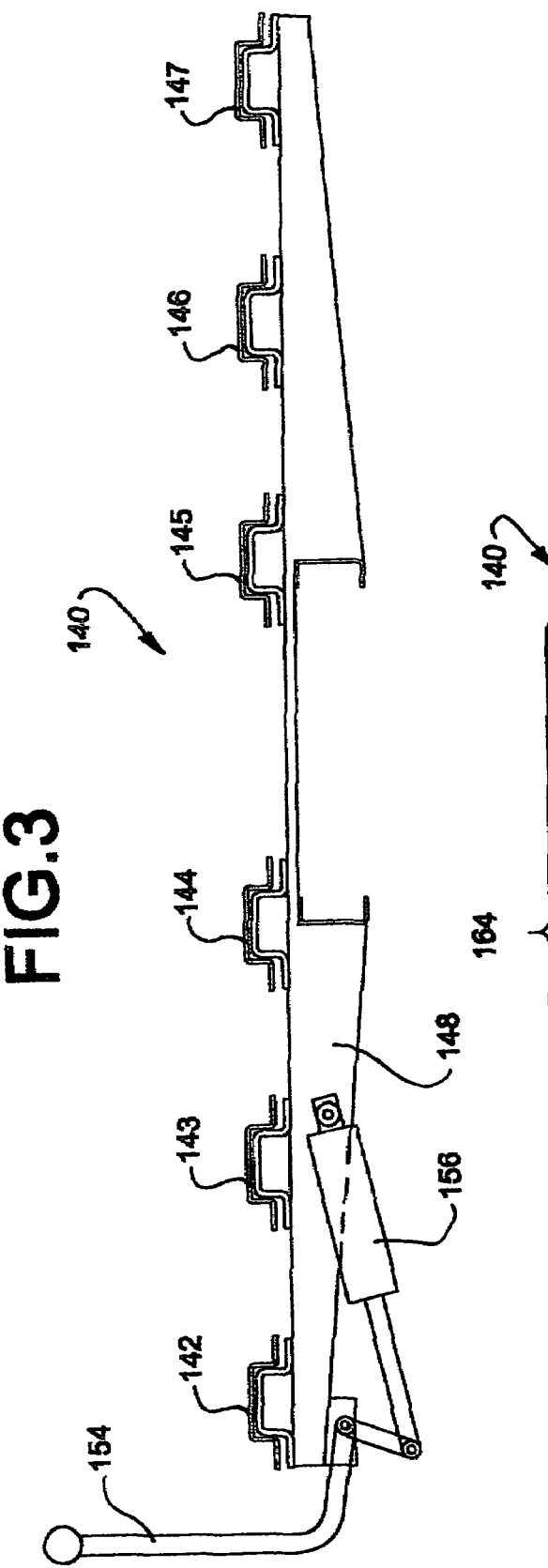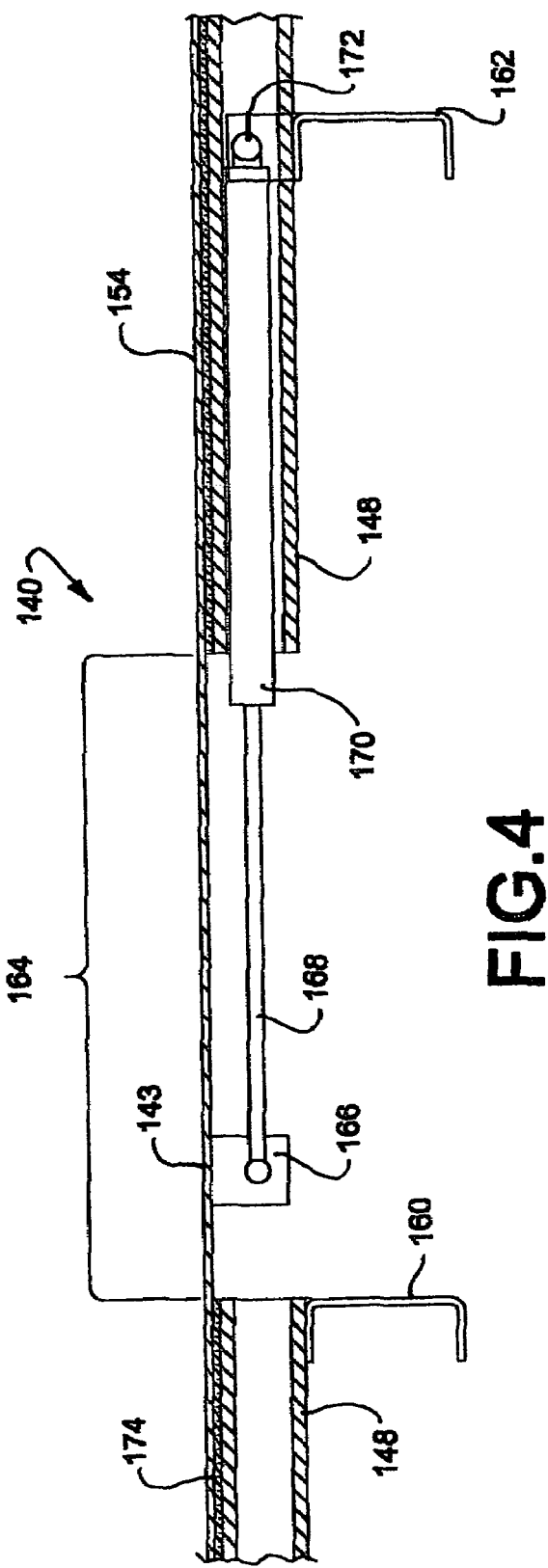

BALE WAGON LOAD RACK AND ROUND BALE UNLOADING ATTACHMENT

BACKGROUND OF THE INVENTION

The present invention relates generally to agricultural self-propelled bale handling machines, and more particularly to the load rack of a bale handling machine, especially for handling big bales, both round and rectangular.

A large proportion of the resources and time of the agricultural industry is directed toward the production of feed for animals, and most specifically to the production of baled stem and leaf crops such as hay. The conventional process is to cut and condition the crop with a windrower, deposit it on the ground to dry, bale the crop when appropriately dry, and then position the bales in stacks for storage or transportation. High labor requirements and increasing costs of hand hauling have caused a growing number of commercial growers to abandon their small square bale operation for a large bale package, such as round bales, or large rectangular bales 3'×3', 3'×4', or 4'×4' in cross-section. Commercial haulers prefer large square bales over small square bales because they can drive into a field and be loaded for a cross-country trip in less than an hour. Large rectangular bales are loaded onto flat-bed trucks or semi-trailers directly in the field at about 20 tons per man-hour. It is these large bales that have become increasingly popular over the last several years, and to which this invention is most concerned.

While a pull-type machine could be designed and built to accomplish the desired tasks of loading, hauling and stacking large rectangular bales, it is most practical to develop a self-propelled unit, using, for example, a generally available truck cab and chassis as the source of motive and hydraulic power.

The problem is to develop a better, more flexible way of moving big bales, both rectangular and round, rearward on the load rack of the bale handler. The push bars in general use today usually advance the bale rearwardly only the distance of one tier. This works well with rectangular bales placed crossways on the load rack, but needs to be more sophisticated when handling round bales, two rows of bales, intermediate rows which are not in line, or when it is desired to move the bales a distance greater than one tier. It is desirable to have a system for advancing bales on the load rack that can easily handle all the aforementioned requirements. Additionally, if round bales are placed on their sides on the load rack, it would be desirable if they could be unloaded onto the ground in their storage attitude, i.e., on the cylindrical surfaces.

SUMMARY OF THE INVENTION

Accordingly, it is an object of the present invention to provide a bale wagon that automatically loads, hauls and stacks large rectangular and round bales.

Another object of the present invention is to provide an automatic bale wagon for large bales that uses a walking floor on the load rack to advance the bales.

It is another object of the present invention to provide a large bale loader, hauler and stacker where the essentially flat surface of the bales are in contact with the floor of the bale wagon.

It is another object of the present invention to provide a load rack that handles a variety of bale sizes, shapes and load configurations.

It is a further object of the present invention to provide a load rack for a bale wagon that can move partial loads toward the rear of the rack for stable transport.

It is a still further object of the present invention to provide a load rack for a bale wagon that can move tiers rearwardly for tier-by-tier unloading.

It is an even still further object of the present invention to provide a load rack for a bale wagon that can move the load, or a partial load, forwardly on the rack.

Yet another object of the present invention is to provide a large bale loader, hauler and stacker that uses several, six being preferred, channel elements to form the primary planar surface of the load rack. All six channels slide to advance the bales, then two channels at a time return to prepare for the next advance while the other four channels hold the bales in place. The bales are moved rearward to the desired location with a number of full and partial advances.

It is yet another object of the present invention to provide a large rectangular bale wagon where channel elements for the primary planar surface of the load rack, the channels being approximately equally spaced across the width of the load rack and covering approximately 50% of the planar surface. The open spaced between channels helping to reduce the overall weight of the bale wagon while allowing robustness in the individual channel components.

It is a still further object of the present invention to provide a large bale handling machine that has a plurality of channel elements to form the primary planar surface to provide a walking floor for the load rack. Push-off mechanisms for stacking can be located in between the channels for a stored home position.

It is an even still further object of the present invention to provide a round bale wagon that transports and stacks bales on their circular ends, but unloads and places the bales on their cylindrical surfaces.

It is an even still further object of the present invention to provide a round bale unloading attachment for a bale handler that uses a tilt bed unloads one stacked tier at a time, and uses a set of movable stakes that can be located appropriately for different bale sizes and configurations.

These and other objects are attained by providing a large bale loading, hauling and stacking apparatus that uses a load rack made of a plurality of longitudinal spaced-apart channel members that move in segments to transfer the load rearwardly for unloading. A tilting bed round bale unloader deposits bales one tier at a time onto their cylindrical surfaces on the ground.

DESCRIPTION OF THE DRAWINGS

The advantages of this invention will be apparent upon consideration of the following detailed disclosure of the invention, especially when taken in conjunction with the accompanying drawings wherein:

FIGS. 2a through 2d are top plan views of the load rack of FIG. 1, showing the channel components in successive positions to move bales along the length thereof;

FIG. 3 is a sectional view of the load rack, taken along lines 3-3 of FIG. 2a, showing the spacing between the channel members;

FIG. 4 is a partial side plan view of the load rack of FIG. 2a, taken along lines 4-4;

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Broadly, the overall machine, or bale wagon, comprises a truck chassis fitted with two modules, a load rack, and, in one embodiment, an unloader attachment. The first module is a loader that clamps and loads the bales endwise over the front center of the truck cab. Manipulation for positioning the bales into tiers is done by the second module, or manipulator, while the bale is sifting on a table. The manipulator then deposits the bales onto the load rack where the stack is formed.

Figure 1:
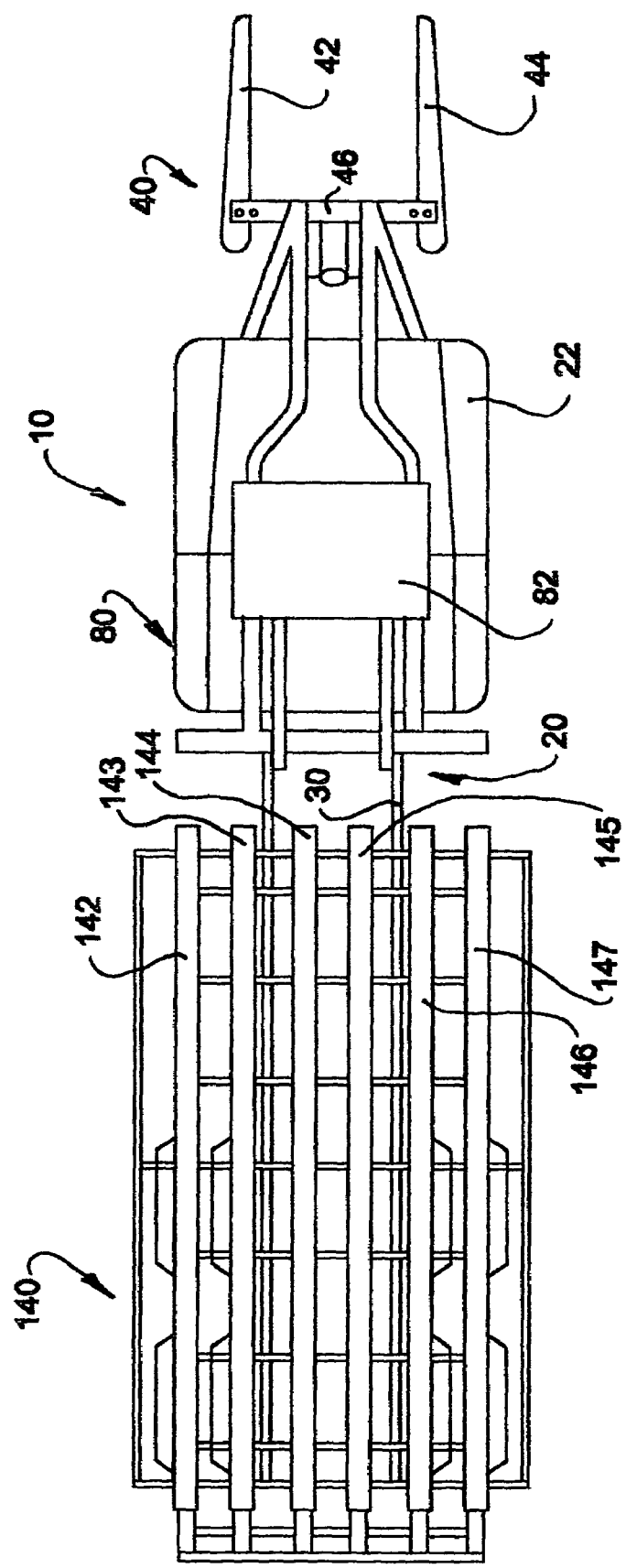
FIG. 1 is a top plan view of the bale loading, hauling and stacking vehicle showing the load rack of the present invention.

FIG. 1 provides a more specific depiction of a loader, hauler and stacker vehicle 10 with which the load rack and unloader of the instant invention can be used. A bale wagon of this type is shown and described in co-pending patent application entitled "Big Bale Loader, Hauler and Stacker" having Ser. No. 11/106,281, filed on Apr. 14, 2005, and with the same named inventor as this application. That co-pending application is incorporated herein in its entirety by reference. A truck chassis 20 with a cab 22 thereon provide the support and motive power for vehicle 10. Chassis 20 includes several components well known in the art, including wheel pairs (see FIGS. 6 and 7) affixed to and supporting a main frame 30 and the various elements making up a self-propelled vehicle combined with an agricultural material-handling apparatus. The wheel pairs are supported on axles and other well known drive components (not shown). A bale loader 40 is mounted to the forward portion of chassis 20, in front of and over the hood and windshield of cab 22. A load rack 140, to be described further below, is pivotably attached to chassis 20 at pivot axis 136 (see FIG. 6).

As alluded to above, the embodiment to be described immediately below employs an over-the-road truck chassis-based machine that loads, hauls and stacks large rectangular bales or round bales. The loading and stack building is accomplished with two modules, the bale loader 40 and a bale manipulator 80 which is described in significant detail in the incorporated co-pending application. In this embodiment the machine deposits the bales on the ground—rectangular bales on non-twine sides and round bales on their cylindrical surfaces. To reduce the overall length required, the manipulator has the ability to rotate round bales to place them on their flat ends on the load rack.

The bales are loaded, manipulated and positioned while clamped. The bales are loaded endways over the front of the truck (FIG. 1). Bale loader 40 clamps the sides of the bales with opposing clamp arms 42, 44 that are each pivotably affixed to loader boom arm 46 and selectively movable relative thereto through the action of clamping cylinders (not shown). Boom arm 46 is rigidly affixed to the loader boom, and the boom is pivotably affixed to the handler main frame—is fixed at one end to the front frame, extending up and over cab 22, and down the back side thereof where it is affixed to truck frame 30 at the other end.

The handler main frame is comprised of two primary frame members. The boom is pivotably connected at the generally horizontal axis extending through pivot points. The loader pivots the bale upwardly and rearwardly from the ground, through 180 degrees to the manipulator table 82, with the bale lengthwise. The boom is pivoted through the selective action of upper and lower respective hydraulic cylinders (not shown). These cylinders are mounted on trunions to allow them to pivot as required during the raising and lowering of the boom relative to the main frame.

Once the bale is positioned on the manipulator table 82 by the loader 40, a manipulator clamp (not shown) clamps the bale to maintain secure and precise positioning for manipulation. Then, the loader releases the bale and returns to its lowered position.

The details regarding manipulation of the bale and deposit thereof onto the load rack are provided in the incorporated co-pending application. It is important to understand, however, that the manipulation mechanism can deposit the bales at substantially any location along the front of load rack 140, i.e., at varying locations side-to-side on the load rack.

Round bale diameters up to 5' can be stacked on their sides. With stanchions 120 (shown in FIG. 11 of the incorporated co-pending application), bales of any diameter could be loaded. The manipulator table would need be adjustable, either hydraulically or manually, for 32" (referred to as "3-foot bales") or 48" wide bales (referred to as "4-foot bales"), each side would move in or out from the center. With round bales, 60" wide table adjustment could be considered as well as 48". Also, with round bales the loader would stop less than 180 degrees rotation, depending on the diameter, to set the bale properly on the manipulator table.

The load rack incorporating the important concepts of this application is shown broadly in FIG. 1, in the form of a walking floor. The concept of a walking floor works well because the surface of the bales that is in contact with the floor is essentially flat. The walking floor concept would include six channel elements 142-147 (though the exact number is not significant—more or less also providing satisfactory results) that form a planar surface. All six channels slide to advance the bales rearwardly, then two channels at a time return to the start position to prepare for the next advance, i.e., four channels hold the bales while two channels slide (see FIGS. 2a-2d). The bales are moved rearwardly to the desired location with a number of full and partial advances. Channels 142-147 are generally equally spaced across the width of the load rack and cover approximately 50% of the planar surface. The push-off mechanism for stacking could be located between the channels for their stored home position and could take the form of the push-off shown and described in the incorporated co-pending application. The open spaces between the channels also help to reduce the overall weight of the vehicle while allowing more robustness in the individual channel components (see FIGS. 3 and 4). FIG. 3 further shows that each channel is held in place and supported by a support channel 148, for example, similarly shaped and dimensioned, though longer by approximately the length of the maximum movement of the walking table, to the channel 143. Finally, FIG. 3 shows a right side bale clamp 154 which is moved inwardly to clamp bales through activation of hydraulic cylinder 156. A similar clamp would be arranged on the left side of the load rack, though one side could be fixed or passive. These clamping devices are optional, but useful to hold position of the load on the load rack under rough field condition, especially when building cross tied tiers.

FIG. 4 is a longitudinal section of channel 143 and its supporting and operational components. Cross braces 160, 162 are part of the load rack support structure affixed to the chassis 30 at spaced intervals along the length thereof. Additionally shown is the open section 164 in the support channel 148 within which the "walking" movement is provided. More particularly, a tab 166 is affixed to the underside of support channel 148 with the ram 168 of a hydraulic cylinder 170 pivotably attached thereto. The cylinder is fixed to the support load rack structure, as at 172. Thus, when cylinder 170 is activated to contract the ram 168, channel 143 moves toward the forward end of the load rack 140, and when it is activated to extend ram 168, the channel moves toward the rear end of load rack 140. With similar mechanisms attached to each of the channels 142-147, the step-wise movement discussed above can be achieved. To facilitate a more frictionless movement, it is practical to apply a composite bearing strip 174 between each channel and the corresponding support channel.

Figure 5C:
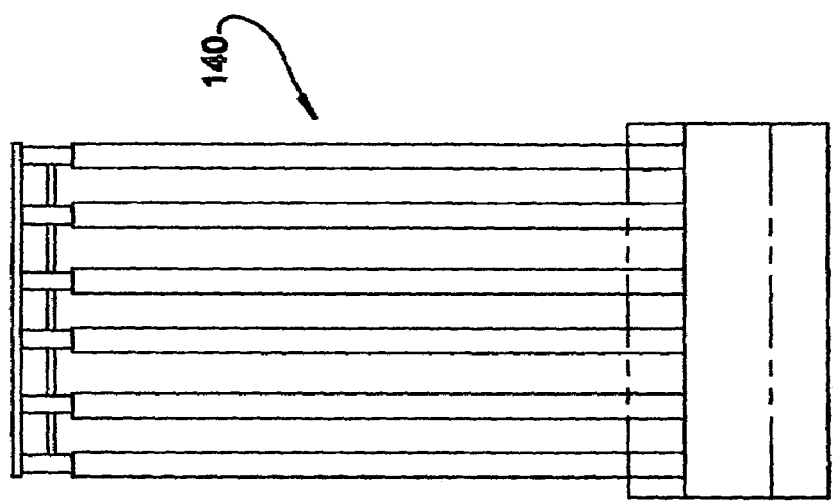
FIGS. 5a through 5c are top plan views of the load rack of FIG. 3, showing that any arrangement of big bales can be advanced any distance with the walking floor.
Figure 5B:
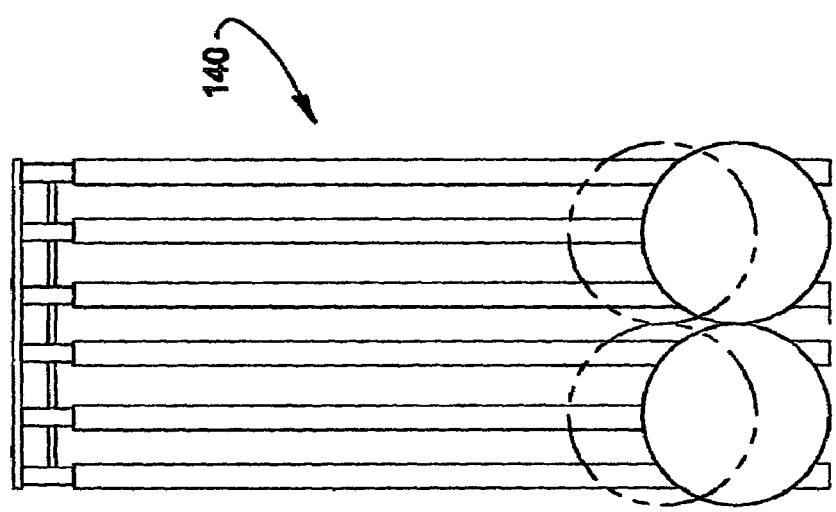
Figure 5A:
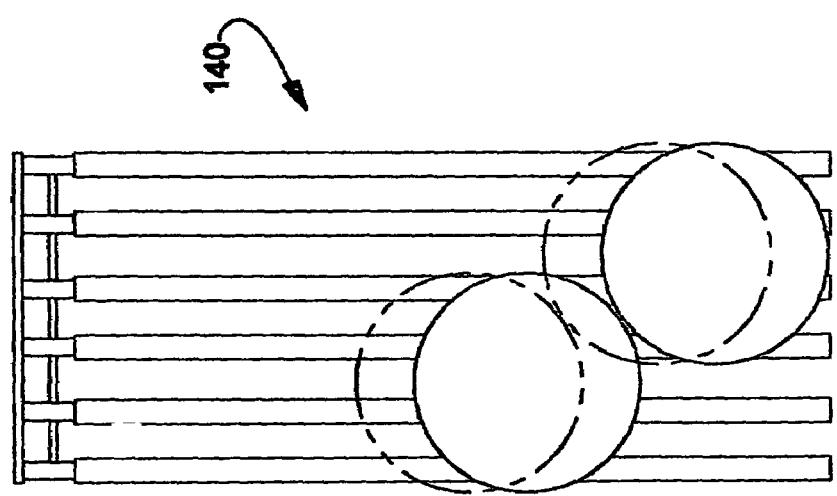

Referring to FIGS. 5a-5c, it can be seen that any arrangement of bales can be advanced any distance rearwardly with the walking floor. Also, a load of bales can be advanced for unloading in some cases (as in the case of the round bale unloading attachment to be discussed later). It is foreseen that the walking floor could be operated in reverse to move a load forwardly, or to conveniently load the unloading assembly for round bale handling.

Figure 6:
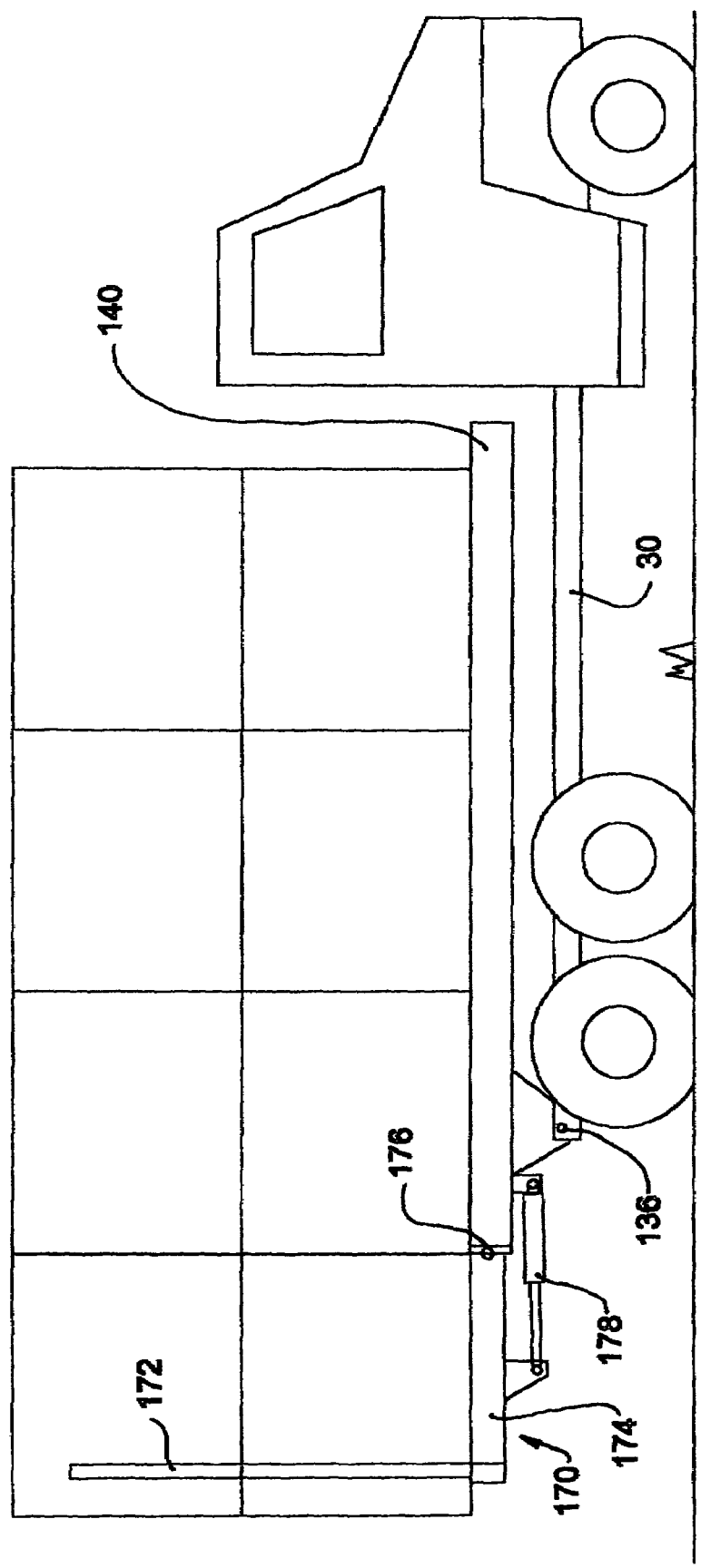
FIG. 6 is a partial side view of a bale wagon with the load rack of the instant invention, showing the round bale unloading attachment (unloader)
Figure 7:
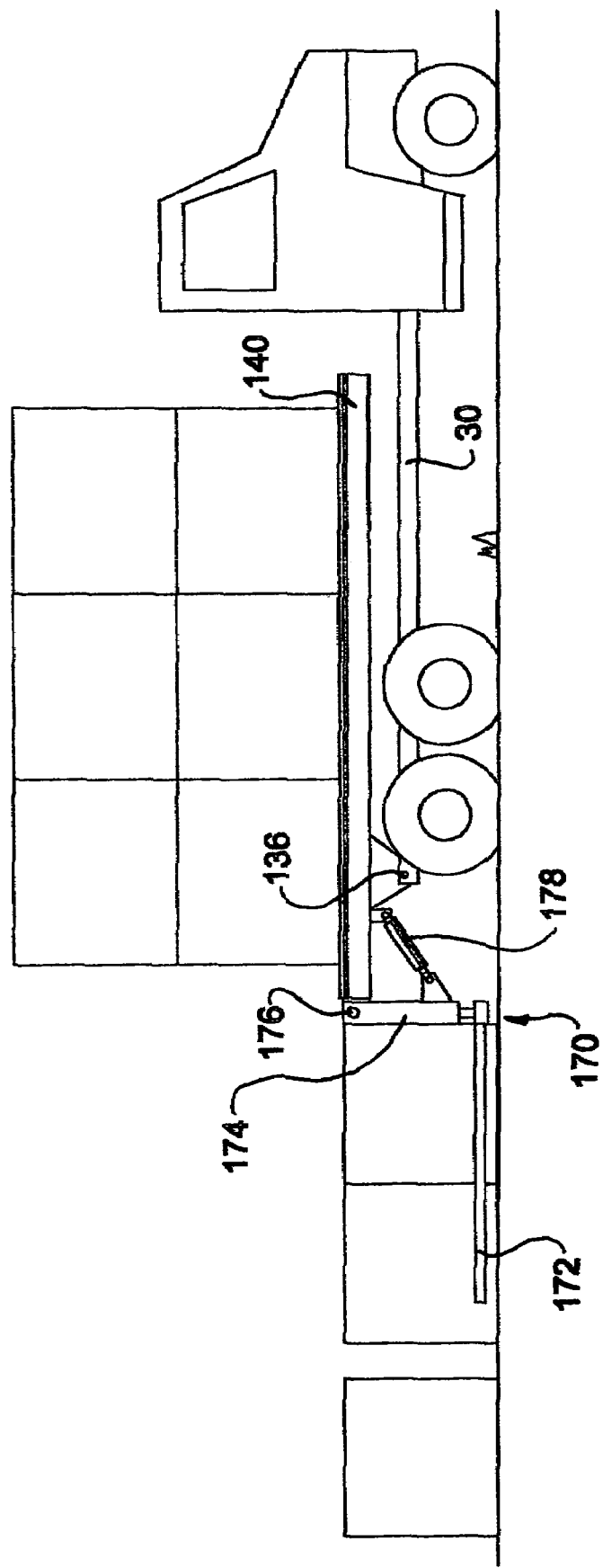
FIG. 7 is a partial side plan view, similar to FIG. 6, of the load rack, showing the unloader in the down position.
Figure 8:
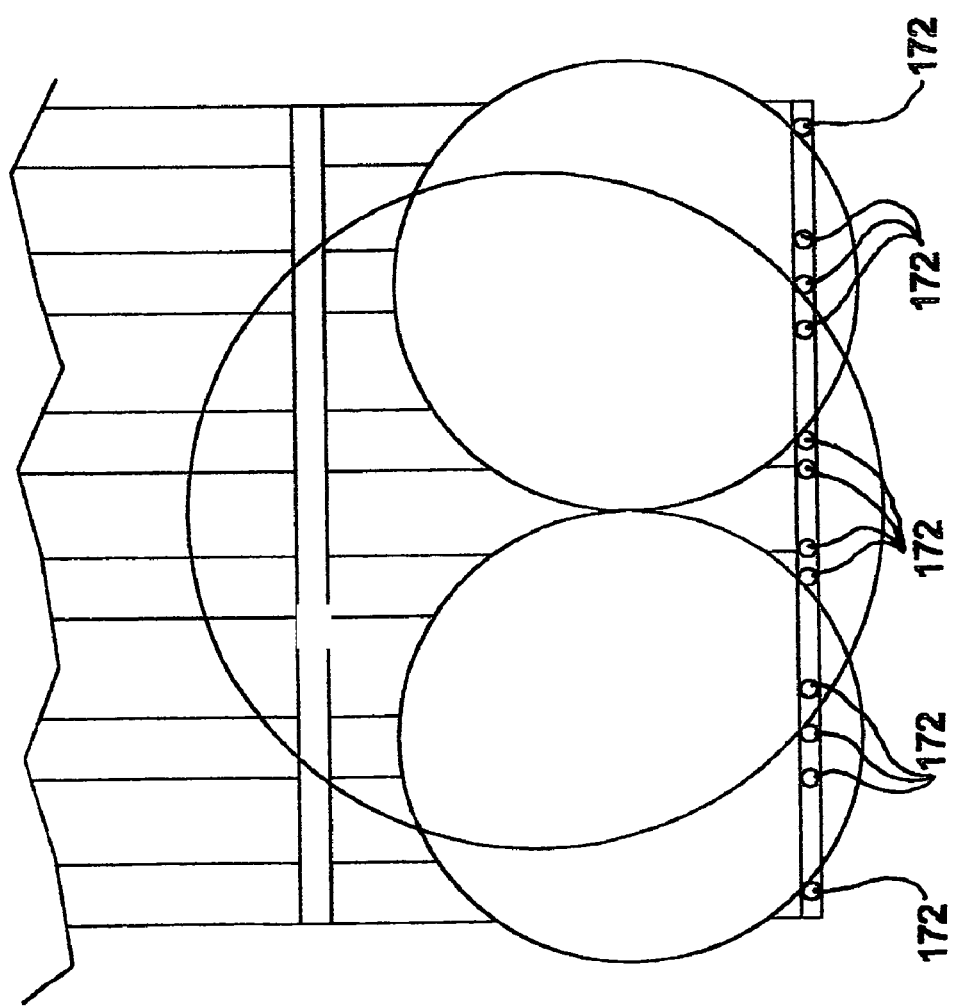
FIG. 8 is a partial depiction of the unloader, showing various positional adjustments of the stakes to handle bales of various sizes.

Referring now to FIGS. 6 and 7, it can be seen that the round bale unloader 170 is intended to unload a tier of round bales onto their cylindrical surfaces. The unloader is attached to the rear of the load rack 140 in place of the usual stacking tines and adds approximately four feet to the length of the load rack. Each tier of bales (side-to-side "layer" in FIG. 6) is advanced to the unloader with the walking floor. Since the walking floor ends rearwardly before reaching unloader 170, the bales must be pushed onto the unloader by other bales on the load rack. To facilitate this activity, the surface of the unloader that bears the weight of the bales can be covered with an anti-friction material, such as polytetrafluoroethylene. Alternatively, the surface could have rollers added. If unloading single bales or single tiers, the last tier or bale in line will not have any other bales to push it rearwardly, so the operator may have to tilt the load rack rearwardly to use gravity to move the bales to the unloading position. The rear stakes 172 (FIGS. 6-8) that provide a backstop for the load support the bales as they are turned and lowered to the ground. The stake frame 174 is pivotably attached to load rack 140 at 176 under the control of hydraulic cylinder 178. As most clearly seen in FIG. 8, the stake frame 174 has multiple positions laterally for the stakes to fit different bale sizes and configurations. The stakes can be available in differing lengths for use with bales of varying sizes, and, in the case of round bales, of lengths to accommodate single tiers. If the stakes are too long, they may interfere with transportation or the unloading process. The bale handler is driven forward, then the unloader is tilted to receive the next tier from the walking floor, and the process is repeated until the unloading is completed.

Figure 9:
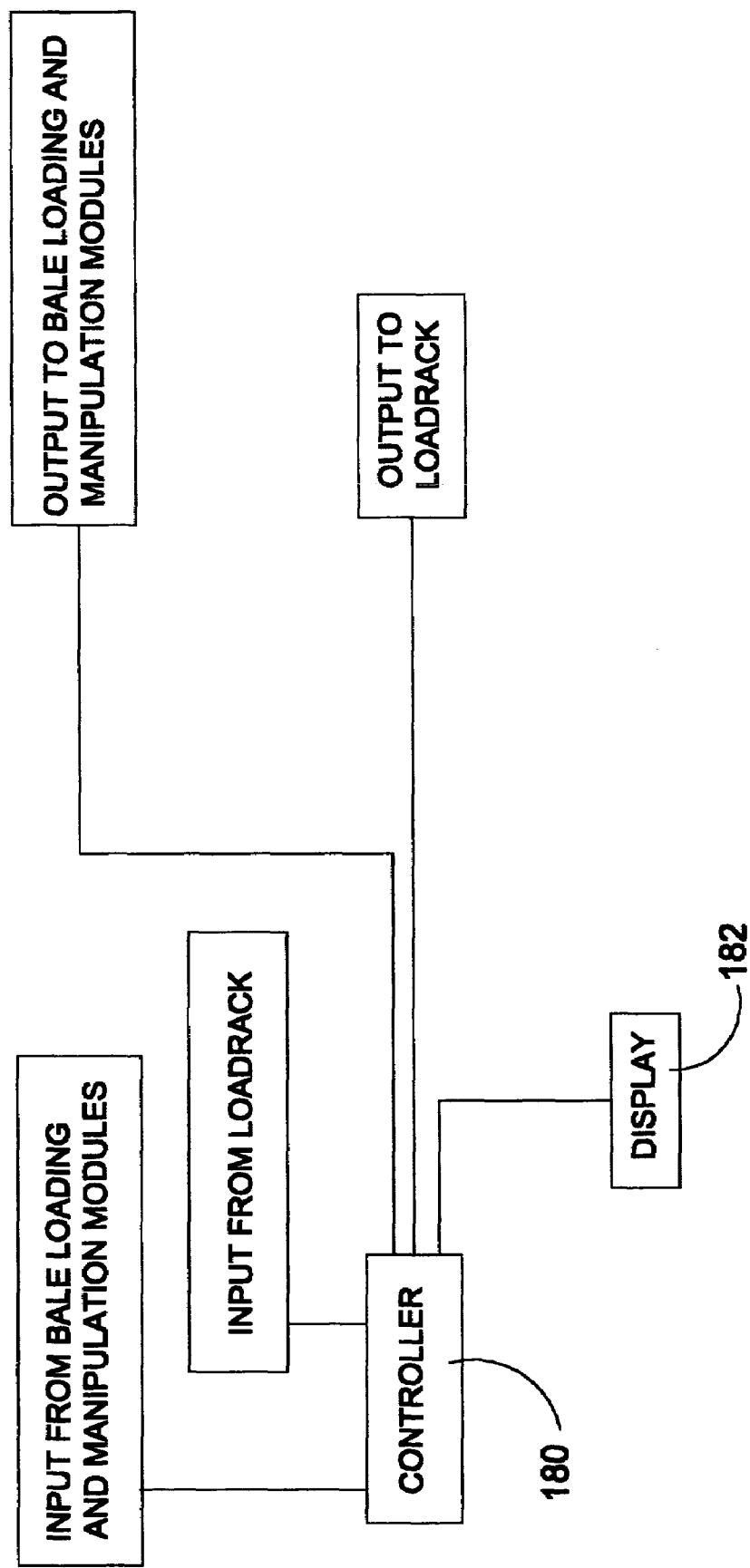
FIG. 9 is a schematic of the control system.

Automation is accomplished by using a controller 180 (FIG. 9) integrated with position feedback sensors and electrically controlled hydraulic valves in both the modules and the load rack. The controller synchronizes movements and positions of the various components throughout the loading and stack building process. The sensors are preferably electric, but can be any type that can meet reliability and endurance requirements. A visual display 182, with or without a touch screen, makes the setup and operation reasonably simple for the operator. The controller also has preset programs for the different sized bales and for different tie tier patterns. It would be desirable for the controller to have a "teach and repeat" capability for unforeseen stack building requirements.

In operation, the truck, with the bale handling components described above, approaches the bale to be loaded in the same direction as the baler traveled through the field (approaching the bale along its lengthwise axis). The truck is driven so that the bale is located centrally of the cab, in line with the bale loader, and the operator or a switch on the loader initiates the loading cycle. The bale loader 40 grasps the bale with clamp arms 42, 44 pivots upwardly and rearwardly, lifting the bale through approximately 180 degrees and deposits it on manipulation table 82 where it is clamped. The loader clamp then releases and returns to a clear position. Next, the bale is moved to the desired tier location through movements of manipulation table 82, and its bale clamp, along the mast. Then, the bale is deposited on the load rack and released by the bale clamp of the manipulation table. When a tier is complete, it is moved rearwardly by the walking table of the load rack. These steps are repeated until the load is complete. The completed stack is placed at the storage location by tilting the load rack approximately 90 degrees and then separating the stack from the load rack with a push-off bar.

The unloader attachment can be integrated into the controller system by the addition of sensors and valve controllers, and additional programming.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a bale wagon for big bales, the bale wagon having a loader for picking bales up from a field, a bale manipulator for selectively rotating a bale picked up by the loader and depositing it in selective locations on a load rack, the improvement comprising:

the load rack has a forward end and an opposing rear end with a longitudinal axis between the two being generally parallel to the direction of travel of the bale wagon, the load rack comprising:

a plurality of elongate spaced-apart channel members extending generally between the front and rear ends of the load rack and forming a generally planar surface of approximately 50% open space, the generally planar surface having a top and an opposing bottom;

reciprocatable power sources affixed to each channel member such that a first selective activation of one of the power sources will slide the respective channel member a predetermined distance in the desired direction of bale movement, and a second selective activation of the one power source will slide the respective channel member to its initial position;

a control device connected to each power source and adapted to selectively and generally simultaneously initiate the first activation of all power sources such that all channel members slide together the predetermined distance; and the control device further adapted to serially initiate the second activation of individual channel members to slide it to its initial position, whereby the bale pickup may grasp and pick up a single bale from the ground, the bale may be manipulated to a desired orientation and deposited on the load rack, and moved along the load rack by the moving the channel members.

2. The improvement of claim 1, wherein:
the reciprocable power sources are hydraulic cylinders connected to respective channel members.

3. The improvement of claim 2, wherein:
the plurality of elongate channel members equals six.

4. The improvement of claim 3, wherein:
the control device is an electronic control unit that processes input signals, makes logic decisions, and provides output, all based upon a predetermined program stored in the control unit.

5. The improvement of claim 4, wherein:
the serial initiation of the second activation is done to adjacent pairs of channel members.

6. The improvement of claim 3, further including:
a round bale unloader for attachment to the rear end of the load rack and comprising:
  a planar platform generally the same width as the load rack pivotably affixed to the load rack for movement from a first position where the platform is generally in the same plane as the generally planar surface of the channel members to a second position where the platform is generally perpendicular and below the top of the generally planar surface of the channel members;
  an hydraulic pivot cylinder affixed to the platform to selectively move it between the first and second locations;
  a plurality of stake support devices in the platform; and
a plurality of stakes fitted into selective stake support devices such that stakes may be supported in selective stake support devices to extend generally parallel to each other away from the platform, whereby bales may be pushed from the load rack onto the platform in the first position, the pivot cylinder activated to pivot the platform to the second position for unloading.

7. The improvement of claim 6, further including:
a reduced friction element on the platform.

8. The improvement of claim 1, further including:
a round bale unloader for attachment to the rear end of the load rack and comprising:
  a planar platform generally the same width as the load rack pivotably affixed to the load rack for movement from a first position where the platform is generally in the same plane as the generally planar surface of the channel members to a second position where the platform is generally perpendicular and below the top of the generally planar surface of the channel members;
  an hydraulic pivot cylinder affixed to the platform to selectively move it between the first and second locations;
  a plurality of stake support devices in the platform; and
a plurality of stakes fitted into selective stake support devices such that stakes may be supported in selective stake support devices to extend generally parallel to each other away from the platform, whereby bales may be pushed from the load rack onto the platform in the first position, the pivot cylinder activated to pivot the platform to the second position for unloading.

9. The improvement of claim 8, further including:
a reduced friction element on the platform.

10. The improvement of claim 9, further including:
a hydraulically powered clamp the load rack to selectively clamp bales on the load rack.

11. A self-propelled bale wagon for big bales, comprising:
a wheel-supported main frame;
a source of motive power supported on the main frame;
a loader supported on the main frame for picking bales up from a field;
a bale manipulator supported on the main frame for selectively receiving a bale from the loader, clamping it and selectively rotating the bale and depositing it in selective locations on a load rack having a front end and an opposing rear end and a longitudinal axis generally therebetween, the load rack comprising:
  a plurality of elongate spaced-apart channel members extending generally between the front and rear ends of the load rack and forming a generally planar surface of approximately 50% open space, the generally planar surface having a top and an opposing bottom;
  reciprocatable power sources affixed to each channel member such that a first selective activation of one of the power sources will slide the respective channel member a predetermined distance in the desired direction of bale movement, and a second selective activation of the one power source will slide the respective channel member to its initial position;
  a control device connected to each power source and adapted to selectively and generally simultaneously initiate the first activation of all power sources such that all channel members slide together the predetermined distance; and
  the control device further adapted to serially initiate the second activation of individual channel members to slide it to its initial position, whereby the bale pickup may grasp and pick up a single bale from the ground, the bale may be manipulated to a desired orientation and deposited on the load rack, and moved along the load rack by the moving the channel members.

12. The improvement of claim 11, further including:
a round bale unloader for attachment to the rear end of the load rack and comprising:
  a planar platform generally the same width as the load rack pivotably affixed to the load rack for movement from a first position where the platform is generally in the same plane as the generally planar surface of the channel members to a second position where the platform is generally perpendicular and below the top of the generally planar surface of the channel members;

an hydraulic pivot cylinder affixed to the platform to selectively move it between the first and second locations;

a plurality of stake support devices in the platform; and a plurality of stakes fitted into selective stake support devices such that stakes may be supported in selective stake support devices to extend generally parallel to each other away from the platform, whereby bales may be pushed from the load rack onto the platform in the first position, the pivot cylinder activated to pivot the platform to the second position for unloading.

13. The improvement of claim 12, further including:
a reduced friction element on the platform.

14. The improvement of claim 13, wherein:
the bales are round bales and the manipulator deposits the bales on the load rack on their flat ends.

15. The improvement of claim 14, further including:
a hydraulically powered clamp the load rack to selectively clamp bales on the load rack.

\* \* \* \* \*